(12) United States Patent
Krueger et al.

(10) Patent No.: US 11,216,693 B2
(45) Date of Patent: Jan. 4, 2022

(54) METHOD FOR PROVIDING AT LEAST ONE EVALUATION METHOD FOR SAMPLES

(71) Applicant: OLYMPUS SOFT IMAGING SOLUTIONS GmbH, Münster (DE)

(72) Inventors: Daniel Krueger, Berlin (DE); Mike Woerdemann, Ostbevern (DE); Stefan Diepenbrock, Münster (DE)

(73) Assignee: OLYMPUS SOFT IMAGING SOLUTIONS GmbH, Münster (DE)

( * ) Notice: Subject to any disclaimer, the term of this patent is extended or adjusted under 35 U.S.C. 154(b) by 268 days.

(21) Appl. No.: 16/523,246

(22) Filed: Jul. 26, 2019

(65) Prior Publication Data
US 2020/0050891 A1    Feb. 13, 2020

(30) Foreign Application Priority Data
Aug. 9, 2018    (EP) .................................... 18188281

(51) Int. Cl.
*G06K 9/62*    (2006.01)
(52) U.S. Cl.
CPC ......... *G06K 9/6256* (2013.01); *G06K 9/6262* (2013.01)
(58) Field of Classification Search
CPC ... G06K 9/6256–6267; G06K 9/00147; G06K 9/0014; G06K 9/4652; G06K 9/00134; G06K 9/4604; G06K 9/4628; G06K 9/627; G06K 9/6271; G06K 9/6277; G06K 9/00127; G06K 9/00684; G06N 3/0454; G06N 3/08; G06N 3/04; G06N 3/0481; G06N 3/084; G06N 3/0427; G02B 21/365; G01N 21/6458; G06T 7/0012; G06T 7/0014; G06T 7/11; G06T 7/90; G06T 2207/20081; G06T 2207/30024; G06T 2207/20084; G06T 2207/10056; G06T 2207/30096; G06T 2207/10024; G06T 2207/10036; G06T 2207/10048; G06T 2207/10068; G06T 2207/10081; G06T 2207/10088; G06T 2207/10116; G06T 2207/20076; G06T 2207/30004; G06T 2207/30016; A61B 5/7267

See application file for complete search history.

(56) References Cited

U.S. PATENT DOCUMENTS

9,870,615 B2 * 1/2018 Schwalb .............. G06K 9/0014
10,664,967 B2 * 5/2020 Barnes ..................... G06T 7/11
(Continued)

*Primary Examiner* — Michael S Osinski
(74) *Attorney, Agent, or Firm* — Rudy J. Ng; Bret E. Field; Bozicevic, Field & Francis LLP (57) ABSTRACT

The invention relates to a method for providing at least one evaluation method for samples (2) in at least one optical application system (5) of a microscope-based application technology,
where the following steps are performed:
  developing the evaluation method at least by an automated training (130) of an evaluation means (60) for an evaluation (120) of a specific type of sample on the basis of the application technology by an optical training system (4), the training (130) determining a training information (200) which at least partially defines the evaluation method,
  at least the training information (200) for distributing (140) the evaluation method to the at least one application system (5), wherein the provision takes place as a function of the type of sample and of the application technology.

15 Claims, 2 Drawing Sheets

(56) References Cited

U.S. PATENT DOCUMENTS

| | | | |
|---|---|---|---|
| 2016/0035093 A1* | 2/2016 | Kateb | G02B 23/24 382/131 |
| 2016/0259963 A1* | 9/2016 | Cohen | G06K 9/6263 |
| 2016/0358335 A1* | 12/2016 | Chukka | G06K 9/00147 |
| 2017/0091528 A1* | 3/2017 | Sawides | G06T 7/187 |
| 2017/0309021 A1* | 10/2017 | Barnes | G06T 7/0012 |
| 2018/0247153 A1* | 8/2018 | Ganapati | A61B 1/005 |
| 2018/0263568 A1* | 9/2018 | Yi | A61B 1/00172 |
| 2018/0315190 A1* | 11/2018 | Sasagawa | G06N 3/08 |
| 2018/0322634 A1* | 11/2018 | Zimmerman | G06K 9/6267 |
| 2018/0322660 A1* | 11/2018 | Smith | G06K 9/6267 |
| 2018/0350467 A1* | 12/2018 | Im | G06K 9/00147 |
| 2019/0102878 A1* | 4/2019 | Zhang | G06N 3/0454 |
| 2019/0108441 A1* | 4/2019 | Thibault | G06N 20/00 |
| 2019/0156481 A1* | 5/2019 | Sekiguchi | G06T 7/0014 |
| 2019/0197358 A1* | 6/2019 | Madani | G06N 3/0481 |
| 2019/0213502 A1* | 7/2019 | Navratil | G06N 20/00 |
| 2019/0236779 A1* | 8/2019 | Hattori | G01N 33/48 |
| 2019/0266486 A1* | 8/2019 | Yamada | G06K 9/4652 |
| 2019/0318208 A1* | 10/2019 | Chai | G06K 9/6256 |
| 2019/0385094 A1* | 12/2019 | Alex | G11B 20/10037 |
| 2019/0392547 A1* | 12/2019 | Katouzian | G06N 3/0445 |
| 2020/0026057 A1* | 1/2020 | Krueger | G06K 9/6289 |
| 2020/0050830 A1* | 2/2020 | Krueger | G06K 9/6256 |
| 2020/0097727 A1* | 3/2020 | Stumpe | G02B 21/365 |
| 2020/0143248 A1* | 5/2020 | Liu | G06N 20/00 |
| 2020/0264419 A1* | 8/2020 | Diederich | G02B 21/086 |
| 2020/0265263 A1* | 8/2020 | Kluckner | G01N 35/00613 |
| 2020/0320701 A1* | 10/2020 | Xiao | G06T 7/155 |
| 2020/0333185 A1* | 10/2020 | Vrabie | G01J 3/2823 |
| 2020/0364502 A1* | 11/2020 | Li | G06K 9/6262 |
| 2020/0372635 A1* | 11/2020 | Veidman | G06T 7/0012 |
| 2020/0372648 A1* | 11/2020 | Zhang | G06T 1/20 |
| 2020/0380669 A1* | 12/2020 | Wu | G06T 7/80 |
| 2021/0056344 A1* | 2/2021 | Zhang | G06N 3/0454 |
| 2021/0073992 A1* | 3/2021 | Konishi | G06K 9/00147 |
| 2021/0117726 A1* | 4/2021 | Zhang | G06K 9/6256 |
| 2021/0133963 A1* | 5/2021 | Takahashi | G06T 7/00 |
| 2021/0142900 A1* | 5/2021 | Lee | G16H 50/20 |
| 2021/0150701 A1* | 5/2021 | Thagaard | G06K 9/3216 |
| 2021/0264130 A1* | 8/2021 | Aimers | G06T 7/90 |

\* cited by examiner

METHOD FOR PROVIDING AT LEAST ONE EVALUATION METHOD FOR SAMPLES

The present invention relates to a method for providing at least one evaluation method for samples. Furthermore, the invention refers to a system, a computer program and a computer-readable medium.

It is known from the state of the art that evaluation methods, such as assays, are used in microscopes for the examination of samples and in particular for the detection of substance effects in the sample. For this purpose, the evaluation methods are elaborately developed in order to obtain the desired result information from the sample recording. If necessary, algorithms can also be used to perform image processing during sample recording. The evaluation methods and in particular the algorithms are often provided by the application in an elaborate way by developing and/or adapting them specifically for the desired sample types.

It is therefore an object of the present invention to at least partially eliminate the disadvantages described above. In particular, it is the object of the present invention to enable an improved development and/or provision of evaluation methods.

The preceding object is solved by a method with the features according to the present disclosure, by a system with the features according to the present disclosure, by a computer program with the features according to the present disclosure and by a computer-readable medium with the features according to the present disclosure. Further features and details of the invention result from the respective dependent claims, the description and the drawings. Features and details which are described in connection with the method according to the invention also apply, of course, in connection with the system according to the invention, the computer program according to the invention as well as the computer-readable medium according to the invention, and vice versa in each case, so that with regard to the disclosure, mutual reference to the individual aspects of the invention is or can always be made.

The object is solved in particular by a method for providing at least one evaluation method for samples with at least one optical application system of a microscope-based application technology.

Advantageously, at least one of the following steps can be performed in a method according to the invention, wherein the steps are preferably performed one after the other in the specified order or in any order, and if necessary also individual steps can be repeated, wherein the steps are preferably performed at least partially or completely automatically:
  developing the evaluation method at least by (manual or at least partially or completely) automated training of an evaluation means for an evaluation of a specific type of sample on the basis of the (at least one) application technology by means of an optical training system, wherein training information which at least partially defines the evaluation method is determined by the training,
  providing at least the training information for distributing the evaluation method to the at least one application system, wherein optionally the providing takes place in dependence on the type of sample and on the (at least one) application technology.

This has the advantage that the evaluation method can be provided by the distribution in such a way that it is specific for the application system and for the sample type examined by this application system. Thus, the provision of the application system can be improved and performed more purposefully and, if necessary, the reliability and accuracy of the evaluation can also be increased by means of the evaluation method in use with the application system. In particular, the method for developing and providing the evaluation method is improved by the fact that the development is performed by another instance (the training system) than the application of the evaluation method by the application system. This increases the flexibility during development and opens up the possibility of using a simpler application system compared to the training system. A further improvement can be achieved by using automated (or machine) training for development, which is faster and more flexible than traditional methods. Thus, the training can be used flexibly for different types of samples, in order to distribute the evaluation method developed by this method according to the type of sample and the at least one application technology for which the evaluation method is to be used. The evaluation method can be used for only one specific sample type and/or only one specific application technology, but advantageously also for several sample types and/or application technologies, and can be distributed accordingly.

The type of sample can be, for example, an allocation of the sample with regard to the specific substances or cell types of the sample and/or with regard to the preparation (e.g. living preparation, thin-layer preparation, stained cells, fixed cells, etc.) and/or with regard to the evaluation (segmentation, classification, regression, etc.). The application technology and training technology in each case concerns, for example, a specific imaging and/or microscopy technique (transmitted light microscopy, fluorescence microscopy or the like) and/or a specific evaluation (segmentation, classification or the like).

The evaluation may be advantageously performed according to the evaluation method by detecting and processing at least one detection information according to the application technology (e.g. at least one image or recording of the sample using the application technology). The processing can then determine result information, which provides additional information compared to the detection information. The result information can be understood as an approximation or estimation of detection information according to the training technology. The detection information according to the application technology is e.g. a sample recording by the application system, e.g. by a transmitted light microscopy in the visible light range, whereas the detection information according to the training technology cannot be determined directly by the application system. A sample recording by the training system can in turn directly provide the detection information according to the training technology, e.g. as a fluorescence image of the sample.

The training may be suitable for training the evaluation tool to perform the estimation of the detection information according to the training technology fully automatically on the basis of detection information according to the application technology. For this purpose, both different detection information for the same sample (and possibly at least a partial same sample range) can be determined—if necessary also fully automatically—within the scope of the training method.

It is conceivable in an inventive method that the training technology and the application technology are configured as different imaging modalities. The application technology can, for example, be configured as a transmitted light microscopy in which RGB filtering (RGB stands for the colors red, green and blue) of the illumination light (i.e. the light which illuminates the sample) takes place. It can also be a transmitted light microscopy in which the sample is uncolored and/or recorded as living cell(s). It is also conceivable that a laser illumination with at least two or at least three different colors is used. Alternatively or additionally a "z-stack" of the sample can be recorded. These are several sample recordings in different planes parallel to a xy plane of the sample (x and y are, for example, the directions of movement of a cross table holding the sample in the application and/or training system and/or z is the direction corresponding to the direction of propagation of the illumination light). For example, the camera and/or a lens and/or the sample can be moved in the z-direction to different positions where the sample is recorded. This movement is performed, for example, fully automatically by motorizing the sample stage.

The (possibly fully automated) development of the evaluation method can at least take place by the optical training system training the evaluation means for the evaluation of the specific type of sample on the basis of the application technology by using both the application technology and the training technology to acquire at least one detection information for at least one sample (of the specific type of sample). Several samples can also be recorded in this way (if necessary fully automatically), whereby only samples of the specific sample type are used here. The evaluation can then be performed on the basis of these observations. The evaluation is, for example, a segmentation and/or classification of the sample and/or an evaluation according to a method of machine learning.

Since the evaluation based on the application technology may not completely cover the information content of the training technology, it can be advantageous to include additional imaging modalities for the evaluation on the application side (in the case of the application system). For example, training using a fluorescence marker can be used to identify areas or cell components on the sample based on the application technology and then determine fluorescence signals on the application system. This ultimately leads to less required fluorescent markers and reduced technical demands on the application system. In other words, a microscope technology or imaging modality, such as fluorescence microscopy using fluorescence marks, can also be used for training purposes, and a (possibly reduced form) of the same microscope technology or imaging modality, but also for a different purpose in the application system.

It is therefore conceivable that the training technology and the application technology differ in terms of microscopy technology (fluorescence microscopy, RGB illumination, transmitted light microscopy) and/or the processing used. The processing is for example a processing of the detection information, like a segmentation or the like.

For example, when the training system (and also the application system) records using (i.e. on the basis of) the application technology, at least one record of information about the sample is determined, e.g. a record and/or an image of the sample. On the basis of the detection information (and thus on the basis of the application technology), result information can then be determined by means of the evaluation. The evaluation is performed, for example, by the evaluation tool (e.g. by means of a neural network and/or methods of deep learning and/or artificial intelligence, which is trained by learning) in such a way that the result information corresponds approximately to another recording information, which was determined by the training system during recording using (i.e. on the basis of) the training technology. The result of this training is the training information, which serves for the later repeated (reproducible) execution of this trained evaluation with application systems. The training information can, for example, be a classifier or a (especially deep learning) model which has been created by the training. In this way, the evaluation method is at least partially defined. Furthermore, the type of sample used for this and/or the application technology can also further define the evaluation method.

The provision of at least the training information for distributing the evaluation method to the at least one application system can take place depending on the type of sample and the application technology. For example, distribution only takes place to those application systems which use the application technology and/or for which certain sample types are used. In order to simplify this, the evaluation method (or the training information) can be assigned to the type of sample and/or application technology used, e.g. by means of a database, a label, an identifier or the like. The database can also have an entry about the application systems, in order to be able to perform an assignment to the evaluation method here. The provision refers, for example, to digital data storage and/or transmission between computer systems.

Distribution as a function of the type of sample and/or of the application technology and/or of further information can, for example, also be effected by the fact that the training information is stored centrally in a cloud system and/or locally, in particular information on the type of sample and/or on the application technology and/or on the further information being assigned to the training information and/ or also being stored. The data is stored, for example, on a permanent, non-volatile data storage and/or in a database.

It may also be advantageous to store information about an evaluation method (such as authors and time of availability of evaluation methods) in a distributed database. These can, for example, be stored redundantly on the training system(s) and/or other computer systems. This can be done, for example, by storing copies of the information in a distributed manner, in order to ensure that the information is matched by (a large number of) these copies, so that the database cannot be manipulated by individual participants. It would also be conceivable to additionally secure these by means of a blockchain method.

The training microscope can perform the training as a fully automated (i.e. especially self-learning) training of the evaluation tool, especially neural network and/or deep learning network, on one or many samples according to the sample type. The training can then be repeated for further samples and sample types, if necessary, in order to develop further evaluation methods. The evaluation method and/or the training may, for example, include at least one of the following evaluations, in particular according to monitored or unmonitored training methods of machine learning:

a) provide a most probable image of A from images B, and/or b) identify from images of B the most likely segmentation of classified objects in the sample according to A, and/or c) perform automatic sample evaluation using (classical) methods of microscopy and/or a mixture of methods using (a) and (b) and/or (classical) methods of analysis, and/or d) apply this sample evaluation according to c) (e.g. a resulting sample result and/or image) as ground truth on Type B images in order to train the evaluation tool to obtain the result of c) (resulting from a mixture of information from A and B) from B only with a good approximation, if any, and/or e) to increase the specificity of the evaluation method, invite further external evaluation tools, e.g. convolutional neuronal networks trained on other systems.

B is a microscopy according to the evaluation technology and A is a microscopy according to the training technology.

It may be advantageous if the training technology is based on stitched images where only a central portion of the optically accessible area of a single image (sample) is used to summarize larger areas of the image. This avoids optical errors in the peripheral areas of the optics and thus increases the quality of the ground truth.

Thus, it is possible that in a reference detection for the detection of detection information according to the training technology for training and/or in a reference processing a stitching is performed in order to obtain comparative information or the ground truth.

Another possible method for reducing optical errors in illumination and imaging is a step-by-step imaging of preferably the same sample areas using both training technology and application technology, where in particular the detected sample areas overlap and thus the same sample areas are subjected to different illumination and imaging conditions. This allows the application situation to be trained more broadly and robustly. This applies in particular to an application on transmission images in well plates, where miniscule effects and reflections of the illumination at the edges of the well plate as well as droplets on the lid of the well plate can produce different illumination intensities depending on the exact position of the images. Said method can be performed e.g. by the training system for learning.

The evaluation method can be used, for example, for one of the following applications:

Counting of objects, especially cells of the sample,
Growth and/or development assessments of cells in the sample,
Quality control of fermentation in the sample,
Effect test of drugs, if necessary with continuous display of the probabilities of effects over time,
Toxicological tests.

The evaluation method can include a single shot analysis or a time sequence analysis.

Preferably, it can be provided that the provision (in particular as digital storage) takes place centrally for a multitude of application systems, preferably by a central (preferably non-volatile) storage of the training information in a cloud (i.e. e.g. central data storage or server) and/or by an Internet-based data exchange with the respective application system. For example, at least two or at least 10 or at least 50 or at least 100 or at least 500 or at least 1000 application systems may be provided as the plurality of application systems, which may be spatially located at separate locations at least 1 km or at least 10 km apart. This has the advantage that the evaluation method can be developed at a central point and then used in application systems. A central development can guarantee a higher reliability of the evaluation method, since this can be performed with higher technical expenditure by the training system than decentralized with application systems. The provision can take place, for example, as an automated data transfer of the training information via a network (such as the Internet) on a central server, e.g. on a cloud system for the provision of a cloud. The cloud system can also provide a database in which further information about the evaluation method is stored in addition to the training information. In this way, the evaluation method can also be assigned to the sample type and/or application technology via the cloud system.

It is possible that the training system is technically more complex than the application system(s), so that the development of the evaluation method is not technically feasible, or at least can be performed with greater effort, in particular through the application system. It may be possible that the application system is less complex than the training system. Thus, only the training system for the central development of the evaluation method can be elaborately produced, and the technical effort and costs for the production of the application system(s) can be reduced.

In addition, the invention may provide for a microscope-based training technology to be used in addition to the application technology when training, whereby the training information is trained to determine an evaluation result based on the application technology that is specific to the training technology. In other words, the training information can be used to determine a specific evaluation result for the training technology based on the application technology. The evaluation result, for example, contains result information, such as a segmentation of, in particular, classified objects of the sample. This enables information specific to the training technology to be obtained, and thus comparable, more easily through the application technology. In particular, the segmentation of information-relevant sample areas is advantageous, as it suppresses the training for the evaluation of non-specific areas and thus reduces the probability of an erroneous evaluation.

Optionally, the application technology can be executed during training and/or by the training system by providing and executing the application technology identically to the application system or only approximately.

Furthermore, it is conceivable that further training systems are planned which develop further evaluation methods at least by training the respective evaluation means for the evaluation of further specific sample types, whereby the sample types differ from each other, and preferably the training systems perform the development and/or provision independently of each other. This can be done, for example, by transferring the training information as digital information (data) to a common data storage for all training systems (e.g. a cloud system). This has the advantage that evaluation methods can also be developed for other sample types and/or application technologies, which can optionally be provided centrally in a cloud system and distributed to the application systems.

In a further possibility, it may be provided that the development is performed automatically by fully automatic sample recording by a detection device and/or by classification and/or by selecting from different training technologies a training technology for the detection of the ground truth via the sample in order to record detection information and/or a ground truth over a sample in the training system. The detection information and the ground truth are connected in particular by the fact that the evaluation means is learned to determine the ground truth from the detection information. In other words, the training information (as transfer information) is specific for the transfer of the recording information into result information according to the Ground Truth. The automated execution of the recording, in particular also a sample selection and/or a change between different samples, can make a fast and reliable "self-learning" training with a multiplicity of training data possible. For the fully automated recording of the sample and/or for the recording of different samples a motorized sample stage or the like is used in the training system. The application system may not require such a sample stage and/or fully automated sample recording, so that manual intervention is required for sample recording.

It is also advantageous if, in the context of the invention, the development is performed automatically by motorizing at least one sample for training in the training system in order to perform a detection at different positions of the sample, whereby the ground truth and/or a detection information for training is determined. The control of this motorized movement of the sample can be done, for example, by the evaluation means, such as a computer program of an evaluation device which is connected to or part of the training system. This enables independent learning by the training system, so that manual interventions are not necessary or only to a reduced extent.

A further advantage can be achieved in the context of the invention if the application system performs an application-side detection of a sample only in accordance with the application technology, which provides a lower information content about the sample than a training-side detection by the training system, wherein preferably the evaluation method is adapted by the training by machine to approximately provide the training-side detection by the evaluation means on the basis of the training information and on the basis of the application-side acquisition. If the application system does not support training-side recording according to the training technology, the training information may be information on how recording by the training technology can still be approximated according to the recording according to the application technology. Training technology is, for example, fluorescence microscopy for cell segmentation and application technology uses uncolored and/or living cells. In order to still be able to perform a comparable segmentation, machine learning and/or a deep learning method can be used, for example. The result of this training is the training information, which thus provides a new evaluation method for the application system and/or can perform this evaluation method in combination with an evaluation tool.

Training technologies can, for example, be technically or time-consuming processes, in particular more complex than the application technology. Training technology includes, for example, microscopic techniques such as confocal microscopy, multiphoton microscopy, FLIM (fluorescence lifetime microscopy), FRET, TIRF (Förster resonance energy transfer), Raman, CARS and/or repeated applications of the same type of recording to increase detection dynamics or signal-to-noise ratio.

As an application technology, less complex methods, in particular technical or temporal compared to training technology, may include transmission, darkfield, phase, illumination via a Fresnel lens or methods that contain information that is difficult to interpret visually (such as the use of a grating in the illumination or observation beam path), TIRF (Internal Total Reflection Fluorescence Microscopy) or HILO microscopy or transmission illumination by coherent light sources.

Also, the application technology may have a lower magnification than the training technology, whereby the latter in particular is trained during training by magnifying and registering the detection information. This has the advantage that a larger detection field can be included in the application.

It may also be possible for the training to be performed by applying a training technology in which a sample is modified, preferably colored or fixed, with the advantage that the evaluation method is configured to perform the application technology on the basis of the training information with an unchanged sample and/or live cell sample (i.e. not modified in the above manner, e.g. uncolored or unfixed, but possibly otherwise modified). Nevertheless, the training information can have the effect that the application system can be used to provide a result that approximates the training technology.

It may be provided within the scope of the invention that, for training purposes, detection information is determined by the training system in accordance with the application technology and comparison information, preferably a ground truth, is determined by the training system in accordance with a training technology via a sample, wherein the training information for providing the comparison information is preferably learned (trained) from the detection information, preferably by self-learning methods and/or machine learning and/or deep learning and/or artificial intelligence and/or artificial neural networks. This enables a reliable and technically less complex determination of result information with the evaluation device, which can be almost equivalent to comparison information. For example, the detection information is at least a sample record using the application technology and the comparative information is at least a sample record using the training technology.

Advantageously, the training information can be a weighting and/or a classifier and/or a (particularly deep learning) model and/or the like for a neural network. The evaluation method can preferably have a neural network which is parameterized and/or executed on the basis of the training information.

Advantageously, within the scope of the invention, it may be provided that the evaluation method is performed as an assay, preferably as a test for the detection of the effect of a substance and/or as a living cell assay, wherein a specificity and/or at least one specificity parameter of the evaluation method is determined preferably after the provision, in particular by a cloud system and/or by the training system, of an evaluation method, preferably by a comparison of detection information with at least one comparison information. The comparison may, for example, calculate a degree of agreement between these two pieces of information. Thus, the evaluation method can be, for example, an examination method to prove the efficacy of certain substances, in particular a molecular biological method. It is preferable to use a database to determine specificity.

It may be provided, in the case of a method in accordance with an invention, that a detection device of the application system and/or the training system and an evaluation device of the application system and/or the training system communicate with one another in encrypted form in order to perform the evaluation method (in particular by executing the evaluation means on the basis of the training information) and/or the training. This makes it difficult to copy the expertise of a semi-skilled neural network to an evaluation system operating outside the secured distribution system. It may also be possible that only the evaluation device which has a secret key, e.g. for encryption, can transmit the result information and/or the detecting information and/or the training information to a cloud system. For this purpose, for example, authentication and/or implementation of encryption on the cloud system is provided.

Furthermore, it is conceivable that a watermark is generated by the cloud system and/or the training system, for example, and preferably integrated into the training information.

This can also be understood as marking the training information. Advantageously, the application system and/or the cloud system can be configured to prevent illegal use (e.g. evaluation with the help of training information, uploading to a cloud system) of training information marked in this way. In particular, integration can take place when the training information is retrieved (e.g. downloaded) from the cloud system.

The watermark can be advantageously integrated into the training information, which is configured as a (preferably deep learning) model. The watermark can be a signature, for example. The embedding of the watermark can be based on the fact that a signature is integrated into a probability density function in the training information. A method for the integration of watermarks in deep learning models is e.g. in the publication "Rouhani, Bita & Chen, Huili & Koushanfar, Farinaz. (2018). DeepSigns: A Generic Watermarking Framework for IP Protection of Deep Learning Models, arXiv:1 804.00750".

Furthermore, to further protect the data, it is conceivable that a watermark may be generated, for example, by the detection device of the application system and/or training system, and preferably integrated into the detection information. Advantageously, the detection device may be configured to output the recording of the sample only with a watermark in order to obtain the detection information from it.

For example, the detection device records the sample by generating an image of the sample using an illumination light on a sensor of the detection device. The detection can then be used as detection information.

Also, an object of the invention is a system for providing at least one evaluation method for samples in at least one optical application system of a microscope-based application technology, comprising:
- at least one application system,
- at least one training system which differs from the application system at least in that the training system provides as microscope technology at least one microscope-based training technology in addition to the application technology, in each case for detecting a sample, in particular by means of transmitted light microscopy, but with different information content.

The training system (but not the application system) can therefore provide both the training technology and the application technology. If necessary, the application system can provide an approximate training technology or a method based on the training technology through computer processing by using the evaluation method. Training technology and application technology may therefore only concern optical technologies, at least in part, using optical means, and thus not pure computer processing.

In particular, it is provided that the training system has an evaluation device which is configured for this purpose:
- developing the evaluation method at least by (at least partially) automatically training an evaluation means for evaluating a specific type of sample on the basis of the application technology in order to determine, by the training, training information which at least partially defines the evaluation method,
- to provide at least the training information for distributing the evaluation method to the at least one application system, wherein the provision preferably takes place as a function of the type of sample and of the application technology.

Alternatively or additionally, the evaluation device may be suitable for performing the steps of a method according to the invention. Thus, the system according to the invention has the same advantages as those described in detail with regard to a method according to the invention.

The evaluation device may, for example, have a computer or be configured as a computer. The evaluation device has, for example, at least one processor which can be connected and/or electronically connected to at least one non-volatile data storage by a signal connection. For example, a computer program, in particular a computer program product, preferably a computer program according to the invention, is stored non-volatile (non-transitory) in the data storage. By means of a signal exchange via the signal connection, the computer program can be read out by the processor in order to execute the computer program (e.g. to perform at least one of the method steps of a method in accordance with the invention). In addition, the evaluation device may include, for example, an input device to initiate and/or control the execution of the computer program. In addition, an output device can be provided for the output of results of the computer program, which can optionally be provided by the input device (e.g. in the form of a touch screen).

It is possible that result information is output for an output device of the application system. The result information is, for example, the result of an evaluation using the training information. It is conceivable that the raw data of the result information are first reduced and/or processed for output.

Optionally, it can be provided that the application system and the training system are connected to a central cloud system via respective Internet connections in order to exchange the training information via the cloud system on an Internet basis. This enables flexible exchange over long distances and central and selective control of the sample type and application technology through the cloud system.

It may also be possible that at least one training system has at least one of the following components:
- a fully motorized sample stage, preferably for moving a sample in three different directions orthogonal to each other,
- a microplate holder for a sample,
- one holder for at least 4 slides for one sample,
- a detection device configured as a color or monochrome camera or RGB camera,
- at least two transmission channels, wherein a first recording of a sample is preferably effected via a first of the transmission channels in order to determine detection information, and a second recording of the same sample is effected via a second of the transmission channels in order to determine comparison information,
- at least one dichroic multiband filter, in particular for passing through spectral RGB and fluorescence ranges and/or for forming a transmission channel for the first recording and a fluorescence channel for the second recording,
- at least one processor of an evaluation device, preferably a GPU, for performing the training,
- a (in particular motorized) revolving turret, which preferably has several identical lenses of the same type, so that production variations are thus taken into account during training,
- a manually movable table, in particular for receiving the sample.

It is conceivable that the recording information, in particular as application data, which for example is recorded by the training system according to the application technology, is processed and/or changed with regard to the application technology. For example, it is intended that different variants, such as different lenses, are used for the specific implementation of the application technology in different application systems. The processing and/or modification may include, for example, adaptation to these differences. It may also be possible that the processing includes a conversion to correct the differences (differences between implementations of the application technology) before training.

For example, it may be more time-consuming if several lenses of the same type are provided on each training system in order to make the training wider accordingly. Therefore, a possible alternative may be to provide synthetic augmentation of the evaluation data by means of a centrally provided transformation method, which is applied to the images of the sample (e.g. detection information). This can be applied to the application data obtained in the training system (e.g. detection information) before training in order to emulate different lens variations of the same type.

It can also be advantageous if a transformation of the acquired application data is converted before the training, so that in the case of possible minor optical deviations between the application technology on the training system and that on the application systems, these are corrected before the training is performed in such a way that an improved evaluation on the application systems is possible.

Both the transformation to augmentation in terms of objective manufacturing deviations and the transformation in terms of optical differences between the application technology on the training system and the application system can in turn be achieved by themselves, preferably through central, automated training.

It is conceivable that the training based on the application technology and/or the implementation of the application technology in the training system differs from the implementation of the application technology in the application system. The training system can therefore provide the application technology in a different way than the application system and/or (unlike the application system) only emulated or synthetic or through a neural network. In particular, the training system may have a different microscope structure for providing the application technology than the application system.

By using multiple channels in the training system, the advantage can be obtained that both the detection information according to the application technology and a comparison information according to the training technology can be acquired by the same training system (like a single microscope) through different channels, in particular simultaneously for a same sample range.

A further advantage may be that both the training system and the application system have a similar transmission channel for determining detection information, the training system additionally having at least one further channel for determining a ground truth for training. The other channel is used to perform the training technology, which can be technically more complex than the application technology. This allows reliable training, especially training according to machine learning, even if the training system and the application system are structurally separate systems and the application system itself cannot be used during training.

In the case of an inventive method and/or system, it is possible that the training information provided and/or the distributed evaluation method may be changed by the application system and/or by another system by further training. For example, a so-called "transfer learning" can be used for this purpose. In other words, the evaluation method, in particular a neural network of the evaluation method, can be trained further.

For example, a weighting of the training information can be further specified on the basis of new training data. This changed training information and/or evaluation method can then be provided or distributed again if necessary.

A computer program, preferably a computer program product, is also the subject of the invention. This may include instructions which, when the computer program is executed by a computer (such as the evaluation device), cause the computer to execute the steps of an inventive method. Thus, the computer program in conformity with the invention has the same advantages as those described in detail with regard to a method in conformity with the invention. The computer program can optionally also be executed as a downloadable digital signal.

Another object of the invention is a computer-readable medium on which a computer program according to the invention is stored (in particular non-volatile). Thus, the computer-readable medium according to the invention has the same advantages as described in detail with regard to a computer program according to the invention. The computer-readable medium is, for example, configured as a (permanent or non-transitory) data storage, such as a flash memory or a hard disk or the like. The computer-readable medium can optionally also be configured as a downloadable digital signal.

Further advantages, features and details of the invention result from the following description, in which embodiments of the invention are described in detail with reference to the drawings. The features mentioned in the claims and in the description may be essential to the invention either individually or in any combination. It is shown:

In the following figures, the identical reference signs are used for the same technical characteristics, even for different embodiments.

Figure 1:
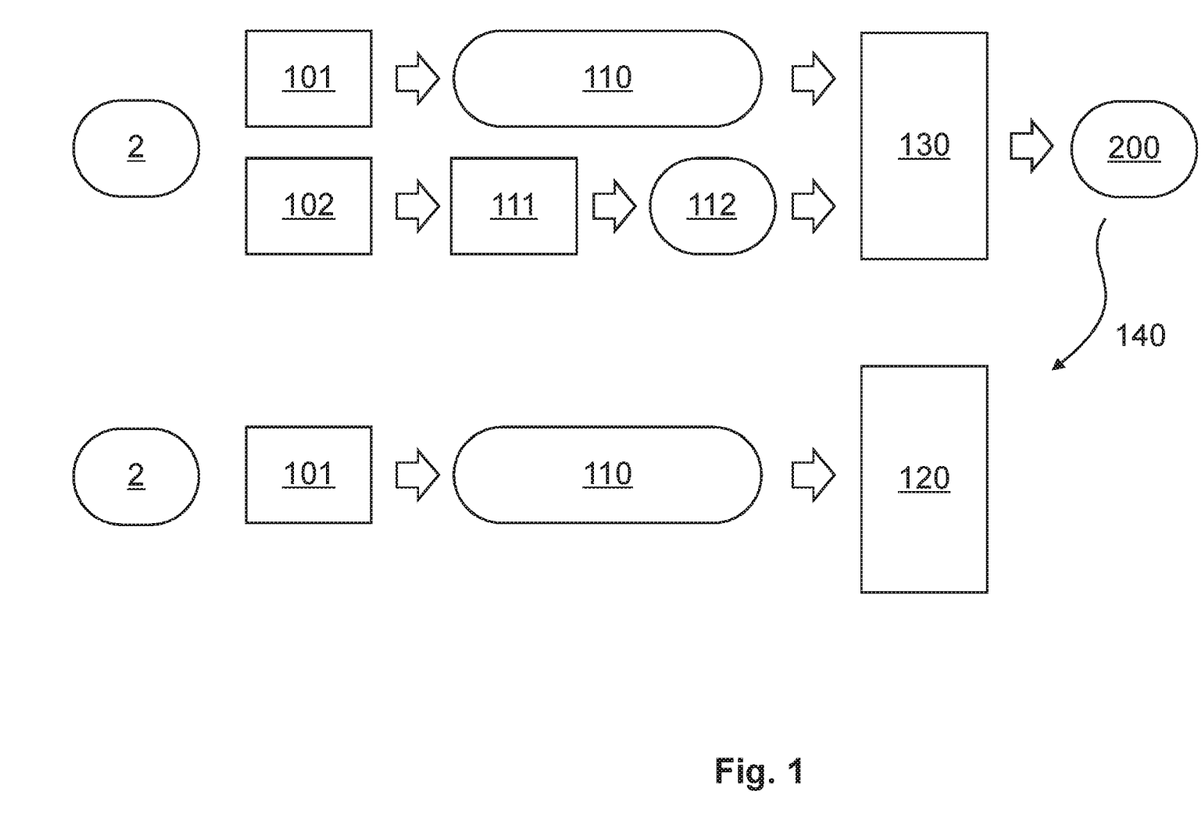
FIG. 1: A schematic representation for the visualization of a method according to the invention.

FIG. 1 schematically visualizes a method according to the invention. The method serves to provide at least one evaluation method for samples 2 with at least one optical application system 5, which is configured according to a microscope-based application technology.

For this purpose, in accordance with a first method step, the evaluation method can be developed at least by (at least partially) automated training 130 of an evaluation means 60, wherein the training 130 is specific for an evaluation 120 of a specific type of sample on the basis of the application technology. The first method step can be performed by an optical training system 4, whereby training information 200, which at least partially defines the evaluation method, is determined by training 130. Subsequently, in accordance with a second method step, at least the training information 200 can be made available for distribution 140 of the evaluation method to the at least one application system 5, wherein the provision is also performed by the training system 4, if appropriate as a function of the type of sample and of the application technology.

It has been shown that to train 130 a detection 101 of a sample 2 can first be performed to determine detection information 110. This detection information 110 (like an image of sample 2) is determined according to an application technology, e.g. transmitted light microscopy of living cells. It can be decisive that this application technology corresponds to the same technology that is also used in application system 5. Subsequently, a reference detection 102 can be performed for training 130. This is used to enter data according to a training technology that is not supported by application system 5. This is a fluorescence microscopy, for example. Optionally, reference processing 111, such as segmentation 111, can then be performed for the recording information according to the course technology. In this way, a ground truth 112 can be determined, which serves as comparison information 112 for learning 130. The training is performed in such a way that an evaluation 120 by an evaluation means 60 can automatically calculate at least approximately the comparison information 112 and/or the ground truth 112 by means of the detection information 110 according to the application technology on the basis of a training information 200. After successful training, the training information 200, e.g. in the form of digital data, is then distributed to at least one application system 5 (according to a distribution 140). There the data detection 101 according to the application technology can also be performed in order to use the evaluation 120 with the training information 200.

Figure 2:
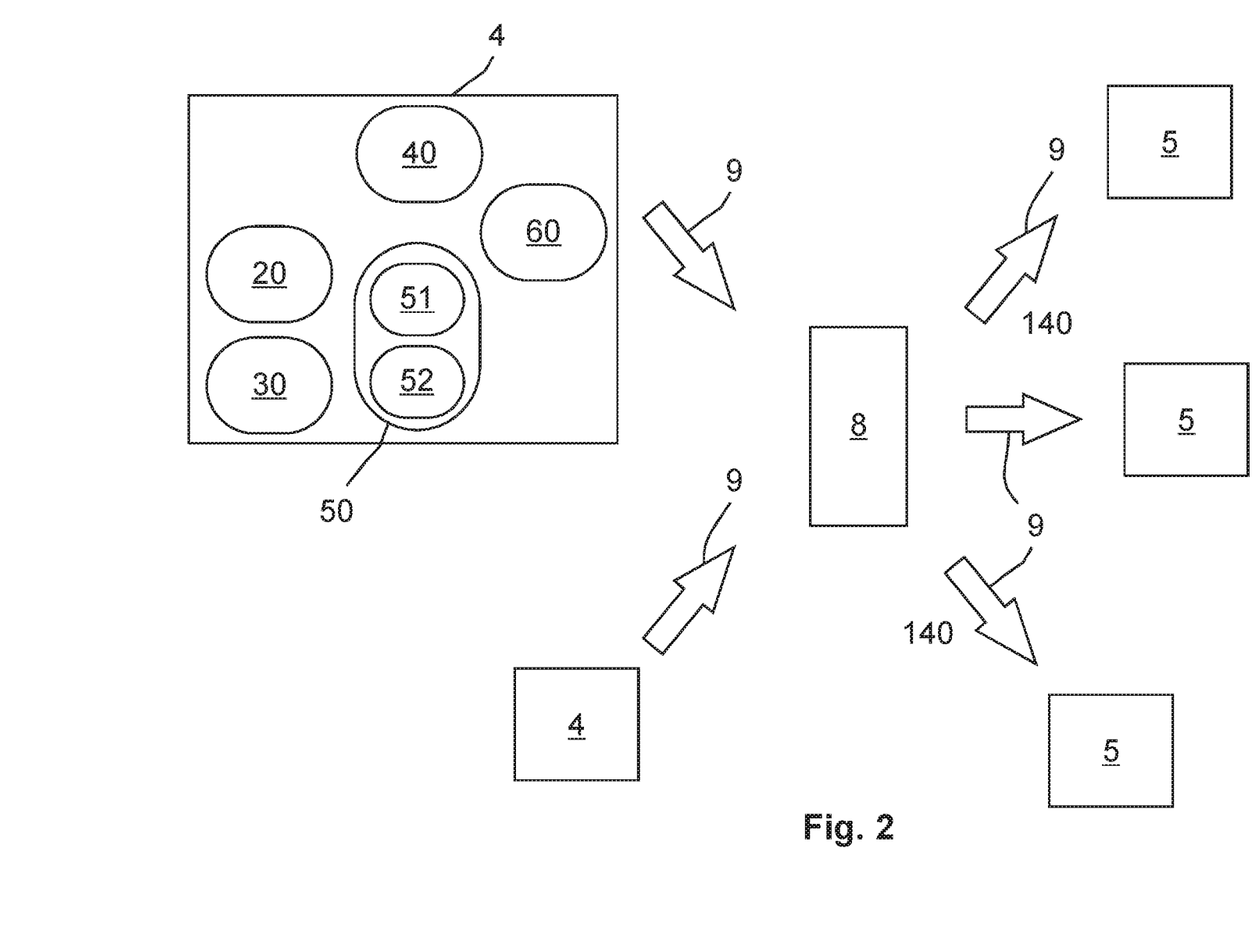
FIG. 2: A schematic representation of a system according to the invention.

FIG. 2 schematically shows a system according to the invention, which also serves to illustrate a method according to the invention. First a training system 4 with further details is shown. This comprises an imaging optical system 20 for imaging sample 2 with a detection device 40, in particular a camera 40. A light source 30 can be used for this purpose. An evaluation device 50, such as a computer with a processor 51 and/or data storage 52, can then be used to execute an evaluation means 60 (such as a computer program 60) for evaluation 120 and/or for training 130. This structure and/or an evaluation device 50 can be provided in a corresponding manner for an application system 5, if necessary in a technically simplified version. Thus, the described structure is to be understood as representative for further training and application systems 4, 5, which may not have to be identically structured. It can be decisive that both the training system 4 and the application system 5 implement an identical or similar application technology. The training system 4 (in contrast to the application system 5) can also only synthetically emulate the application technology, e.g. through a neural network. This means that application technologies that cannot be implemented on the hardware side can also be used with Training System 4. On the other hand, for the identical training of the application technology, both for the training system and for the application system 4, 5, at least a similar imaging optical system 20 and light source 30 should be provided for both. The training information 200 can then—in order to make the evaluation method usable for application systems 5—be transmitted to a cloud system 8 via an Internet connection 9, for example. From there the training information 200 can be retrieved e.g. from at least one or more application systems 5. In this way, distribution can take place in order to provide the evaluation method in a technically simpler and more reliable way.

All application and training systems 5, 4 can be operated independently of each other.

The preceding explanation of the embodiment describes the present invention exclusively in the context of examples. Of course, individual features of the embodiments can be freely combined with each other, if technically reasonable, without leaving the scope of the present invention.

REFERENCE CHARACTER LIST

2 Sample
4 Training system, training microscope
5 Application system
8 Cloud system, central computer system for cloud computing
9 Internet connection
20 Imaging optics
30 Light source
40 Detection device, camera
50 Evaluation device, computer
51 Processor
52 Data storage
60 Evaluation means
101 Detection
102 Reference acquisition
110 Detection information
111 Reference processing, segmentation in 2D or 3D
112 Ground Truth, comparison information
120 Evaluation, Machine learning inference
130 Training, Machine learning training
140 Distribute
200 Training information, transfer information, trained model

The invention claimed is:

1. A method for providing at least one evaluation method for samples in at least one optical system of a microscope-based technology,
where the following steps are performed:
developing the evaluation method at least by an automated training of an evaluation tool for an evaluation of a specific type of sample on the basis of the microscope-based technology by an optical training system configured for training the evaluation tool, the training determining a training information which at least partially defines the evaluation method, and
providing at least the training information for distributing the evaluation method to the at least one optical system, wherein the providing takes place in dependence on the type of sample and on the microscope-based technology.

2. The method according to claim 1,
wherein
the providing takes place centrally for a multitude of optical systems, by central storage of the training information in at least a cloud or by Internet-based data exchange with a respective optical system.

3. The method according to claim 1,
wherein
in addition to the microscope-based technology, a microscope-based training technology is executed during training, whereby the evaluation tool is trained to perform an estimation of a detection information according to the microscope-based training technology on the basis of a detection information according to the microscope-based technology.

4. The method according to claim 1,
wherein
further optical training systems are provided which develop further evaluation methods at least by training respective evaluation tools for evaluating further specific sample types, the sample types differing from one another, and the further optical training systems perform at least the developing or the providing independently of one another.

5. The method according to claim 1,
wherein
the developing is performed automatically in that, in order to assign at least a detection information or a ground truth about a sample in the optical training system fully automatically,
at least one detection device in the form of a camera is provided, which captures images of a sample classifies the images and selects a microscope-based training technology from various training technologies for assigning the ground truth about the sample.

6. The method according to claim 1,
wherein
the developing is performed automatically by moving at least one sample for training motorized in the optical training system to perform a detection at different positions of the sample, thereby determining at least a ground truth or a detection information for training.

7. The method according to claim 1,
wherein
the optical system captures images of a sample only in accordance with the microscope-based technology, which provides a lower information content about the sample than images captured by the optical training system, wherein the evaluation method provides the training information for training the evaluation tool on the at least one optical system to approximately provide a detection information on the basis of the optical training system.

8. The method according to claim 1,
wherein
the training is performed by a microscope-based training technology according to which a sample is modified, colored or fixed, the evaluation method being configured to perform the microscope-based training technology with an unchanged sample using the training information.

9. The method according to claim 1,
wherein
for training, detection information is determined in accordance with the microscope-based technology and comparison information is determined by the optical training system in accordance with a microscope-based training technology via a sample, the training information for providing the comparison information from the detection information by at least self-learning methods or machine learning or deep learning or artificial intelligence or artificial neural networks.

10. The method according to claim 1,
wherein
the evaluation method is configured as an assay, as a test for at least proving the effect of a substance or as a living cell assay, a specificity of the evaluation method being determined after the providing, a specificity of the evaluation method being determined by a comparison of detection information with at least one comparison information.

11. A system for providing at least one evaluation method for samples in at least one optical system of a microscope-based technology, comprising:
the at least one optical system, and
at least one optical training system which differs from the optical system at least in that the optical training system provides two microscope technologies, comprising:
at least one microscope-based training technology and the microscope-based technology,
wherein the two microscope technologies are used for capturing images of a biologic sample with different information contents,
the optical training system comprising an evaluation device in the form of a computer with a processor and a data storage, wherein the evaluation device is adapted therefor,
developing the evaluation method at least by an automated training of an evaluation tool for an evaluation of a specific type of sample on the basis of the microscope-based application technology to perform an evaluation of the evaluation method at least by an automated training of the evaluation tool for an evaluation of a specific type of sample, in order to determine by the training a training information which at least partially defines the evaluation method, and
providing at least the training information for distributing the evaluation method to the at least one optical system, wherein the providing takes place in dependence on the type of sample and on the microscope-based technology.

12. A system according to claim 11,
wherein
the optical system and the optical training system are connected to a central cloud system via respective Internet connections in order to exchange the training information via the cloud system in an Internet-based manner.

13. The system according to claim 11,
wherein
both the optical training system and the optical system have a same transmission channel in order to determine detection information, the training system additionally having at least one further channel in order to determine a ground truth for the training.

14. A computer configured to execute a computer program comprising instructions which, when the computer program is executed by Ratite computer, cause the computer to execute the steps of the method according to claim 1.

15. A non-transitory computer-readable medium on which the computer program is stored according to claim 14.

* * * * *